United States Patent [19]

van den Branden Lambrecht et al.

[11] Patent Number: 6,057,882
[45] Date of Patent: May 2, 2000

[54] TESTING ARCHITECTURE FOR DIGITAL VIDEO TRANSMISSION SYSTEM

[75] Inventors: Christian J. van den Branden Lambrecht, Sunnyvale; Vasudev Bhaskaran, Mountain View; Albert W. Kovalick, Santa Clara, all of Calif.; Murat Kunt, Grandvaux, Switzerland

[73] Assignee: Hewlett-Packard Company, Palo Alto, Calif.

[21] Appl. No.: 08/738,620
[22] Filed: Oct. 29, 1996
[51] Int. Cl.⁷ .................................................. H04N 17/00
[52] U.S. Cl. ............................................. 348/192; 348/181
[58] Field of Search .................................. 348/192, 181, 348/184, 180, 187, 188

[56] References Cited

U.S. PATENT DOCUMENTS

| | | | |
|---|---|---|---|
| 5,214,508 | 5/1993 | Stevens | 348/181 |
| 5,313,280 | 5/1994 | Straus | 348/189 |
| 5,574,500 | 11/1996 | Hamada et al. | 348/180 |
| 5,731,839 | 3/1998 | Panaro | 348/180 |
| 5,751,766 | 5/1998 | Kletsky et al. | 348/192 |
| 5,764,284 | 6/1998 | Stoker | 348/181 |
| 5,798,788 | 8/1998 | Meehan et al. | 348/180 |

*Primary Examiner*—Victor R Kostak

[57] ABSTRACT

An automatic testing method and device is described that can test a video sequence coder/decoder system and either assess the quality of decoded sequences or rate the fidelity of the coding chain. The device produces synthetic test patterns that induce the appearance of known artifacts, then tracks and evaluates such artifacts. Based on this evaluation, it can rate the system's performance in a way that correlates well with human assessments. In our testing device, the quality estimation module performs this function.

18 Claims, 9 Drawing Sheets

TESTING ARCHITECTURE FOR DIGITAL VIDEO TRANSMISSION SYSTEM

BACKGROUND OF THE INVENTION

1. Field of the Invention

The present invention relates to digital video transmission systems and, more particularly, to testing digital video transmission systems.

2. Description of the Related Art

As the market and number of products for multimedia applications grow, the need for testing methods and fidelity metrics becomes critical. Testing devices are important for the development and evaluation of multimedia products, for example, to assess MPEG coding fidelity.

It is important to test digital coders/decoders during either their development or installation. However, assessing picture quality in the digital domain is a problem because it involves human perception. The most commonly used metric, the signal-to-noise ratio, does not match human judgment well. See, for example, P. M. Farrelle, *Recursive Block Coding for Image Data Compression*, Springer Verlag, New York, 1990.

Furthermore, conventional digital transmission testing systems typically transmit and evaluate natural scenes. This approach has several disadvantages. Natural scenes are resolution dependent and hence are difficult to produce with varying frame rate or size. Furthermore, complex natural scenes can require a large amount of memory to store and provide little latitude in testing the features of a particular coder due to the inflexibility of these scenes. Moreover, the test patterns are not deterministic (that is, we do not know the equations producing them), which makes quality evaluation difficult.

Thus, it can be seen that conventional digital testing systems using natural scene testing techniques impose limits upon current digital video testing devices, and hinder the use of these devices in many applications.

Therefore, there is an unresolved need for an automatic testing device that can test a video sequence coder/decoder system to assess the quality of decoded sequences and rate the fidelity of the coding chain in a way that correlates well with human assessments.

SUMMARY OF THE INVENTION

An automatic testing method and device is described that can test a video sequence coder/decoder system and either assess the quality of decoded sequences or rate the fidelity of the coding chain. The device produces synthetic test patterns that induce the appearance of known artifacts, then tracks and evaluates such artifacts. Based on this evaluation, it can rate the system's performance in a way that correlates well with human assessments. In our testing device, the quality estimation module performs this function.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–9. Those skilled in the art will readily appreciate that the detailed description given herein with respect to these figures is for explanatory purposes, however, because the invention extends beyond these limited embodiments.

We describe herein an automatic testing device that can test a video sequence coder/decoder system and either assess the quality of decoded sequences or rate the fidelity of the coding chain. The device produces synthetic test patterns that induce the appearance of known artifacts, then tracks and evaluates such artifacts. Based on this evaluation, it can rate the system's performance in a way that correlates well with human assessments. In our testing device, the quality estimation module performs this function.

System Structure

We base our test methodology on a library of synthetic test patterns, which offer several advantages over natural scenes:

Algorithmically generated synthetic patterns are resolution independent and hence can be generated with any frame rate or size.

Synthetic patterns require much less memory than complex natural scenes.

Algorithms can be designed to generate customizable patterns, which provide more latitude in testing the features of a particular coder.

Test patterns are entirely deterministic (that is, we know the equations producing them), which makes quality evaluation easier.

Two key questions are associated with such a procedure: 1) Is a procedure that uses synthetic test patterns a valid test procedure? and 2) Can synthetic scenes accurately test a digital-image coder designed to process natural scenes?

This test methodology is valid provided the synthetic sequence, when presented to the test device, has a behavior comparable to that of natural sequences. This implies that the test pattern scenes have the same coding complexity and basic features as the natural images. That is to say, the synthetic scene should produce the same amount of distortion as a natural scene and should contain contours or textures that resemble natural elements. We imposed this requirement when designing each test sequence.

Figure 1:
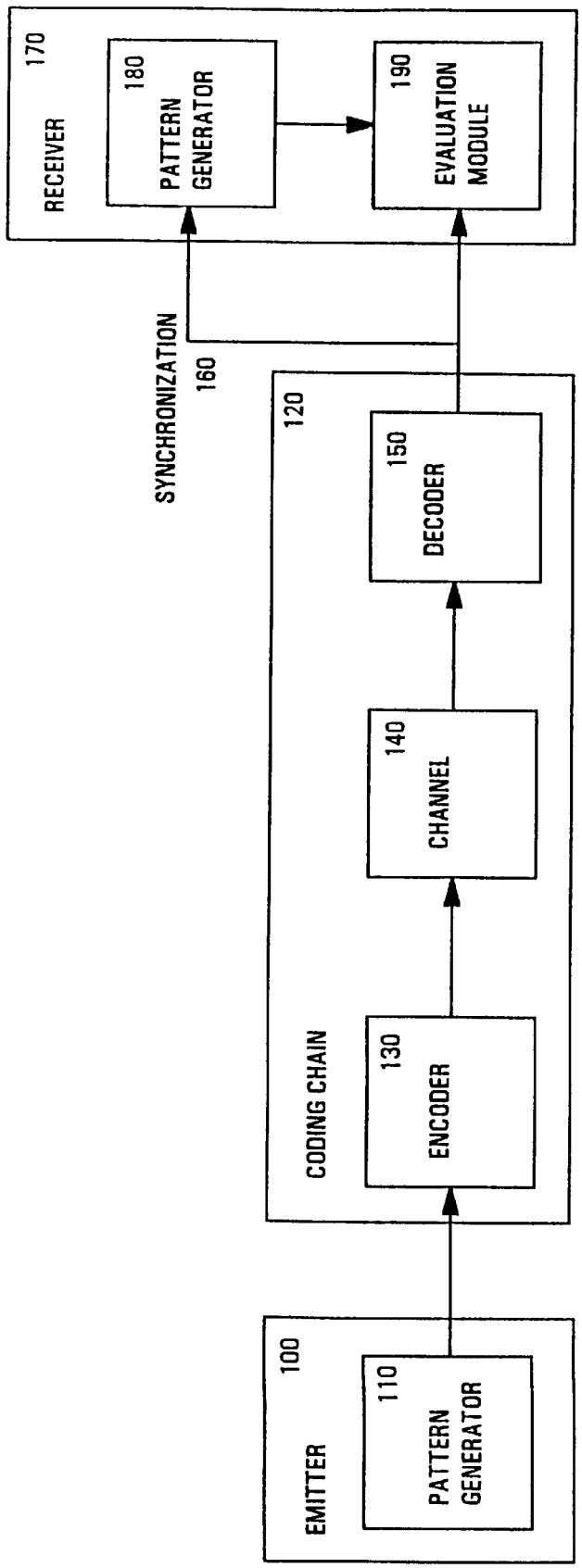
FIG. 1 is a block diagram illustrating a testing architecture embodiment according to the present invention.

FIG. 1 is a block diagram depicting a testing system, which consists of emitter-encoder and decoder-receiver tandems, as practiced according to one embodiment of the present invention. One can view the testing device as consisting of two modules, namely the emitter 100 and the receiver 170. Emitter 100 and receiver 170 are coupled to the respective head and tail end of coding chain 120, which includes encoder 130, channel 140 and decoder 150. For one embodiment, the encoder 130 and decoder 150 are MPEG-based and are external to the testing device. Alternately, the encoder 130 and decoder 150 are internal to the tester. For an embodiment wherein encoder 130 is tested, the channel 140 and decoder 150 are internal to the tester. Similarly, for an embodiment wherein decoder 150 is tested, the decoder 150 and channel 140 are internal to the tester. For yet another alternate, the encoder 130 and decoder 150 operate according to a non-MPEG protocol.

The emitter 100 includes a pattern generator 110, while the receiver 170 includes the quality evaluation module 190 and a pattern generator 180 able to produce patterns similar to those produced by the pattern generator 110 (of the emitter 100). Thus, the testing device has access to the original and decoded versions of the test sequence from which the quality evaluation module 190 can make quantitative measurements regarding image fidelity.

Because both pattern generators 100 and 180 preferably generate the same sequences concurrently to estimate quality, we have designed a synchronization procedure and inserted synchronization information 160 into the test pattern. Furthermore, the pattern generator 180 in the receiver 170 must know which pattern the pattern generator 110 of emitter 100 generated. The test pattern also includes pattern related-information, which the receiver module 170 extracts from the decoder 150 output.

Synchronization

We use Barker codes to synchronize the two test pattern generators located at two different sites. Alternate synchronization schemes are known in the art, however, and may be employed. Barker codes are useful for synchronization because their autocorrelation sequence has a value of one for any lag not equal to zero and a value equal to the code length for a zero lag (see, for example, M. S. Roden, *Digital Communication Systems Design*, Prentice Hall, Englewood Cliffs, N.J., 1988.). The emitter 100 communicates synchronization and pattern customization information to the receiver 170, because the testing device considers the whole coding chain 120 (encoder 130-channel 140-decoder 150) to be a black box.

Furthermore, for an embodiment wherein we may not manipulate the encoder 130 output bitstream, we insert the data into images of the sequence as follows. The first frame of the test sequence, called the synchronization frame, contains the desired synchronization and customization data. Luminance values represent bits of data; typically, the lowest possible value represents a 0 and the highest value a 1. For one embodiment, these values are 16 and 235 according to Comité Consulatif International des Radio Communications (CCIR) Recommendation 601. See, *CCIR Recommendation 601-1, Digital Television Coding Parameters for Studio Recommendations and Reports of the Consultative Committee for Radiocommunications*, Vol. XI-1, pp. 319–328, 1986.

For one embodiment, every bit (i.e., every pixel of the synchronization frame) is replicated several times in both the horizontal and vertical directions to recover error-free synchronization data. The number of repetitions is a function of image dimension. Thus, if the encoder 130 is scalable, this avoids problems due to downsampling of the images.

For one embodiment, the synchronization 160 part contains two length-13 Barker codes. We chose this word length to be very robust to channel error. Modules are synchronized when the receiver 170 receives synchronization code with fewer than four bit errors. This yields a correct-locking probability of $1.0-10^{-23}$ and a $1.69 \times 10^{-8}$ false-locking probability.

Customizing Test Sequences

With this testing device, users have considerable flexibility in specifying the test sequences. For instance, users can specify which test to run and the test image dimensions. They can also define a suite of tests, i.e., a new test that combines other existing tests or suites. Furthermore, for every test or suite, users can specify how many times the device performs the test procedure. They may also specify the portion of the display to use for quality evaluation. Table 1 lists the structure of the synchronization frame, which completely specifies the test to be performed, for one embodiment of the present invention.

TABLE 1

Structure of the test synchronization frame.

| Component | Size (bits) |
| --- | --- |
| Synchronization code | 32 |
| Image X-size | 16 |
| Image Y-size | 16 |
| Test number | 16 |
| Test suite number | 16 |
| Test repeat number | 16 |
| Number of frames in test | 16 |
| Active portion | 4 × 16 |
| Other parameters or future extensions | 144 |
| Total | 336 |

Figure 2:
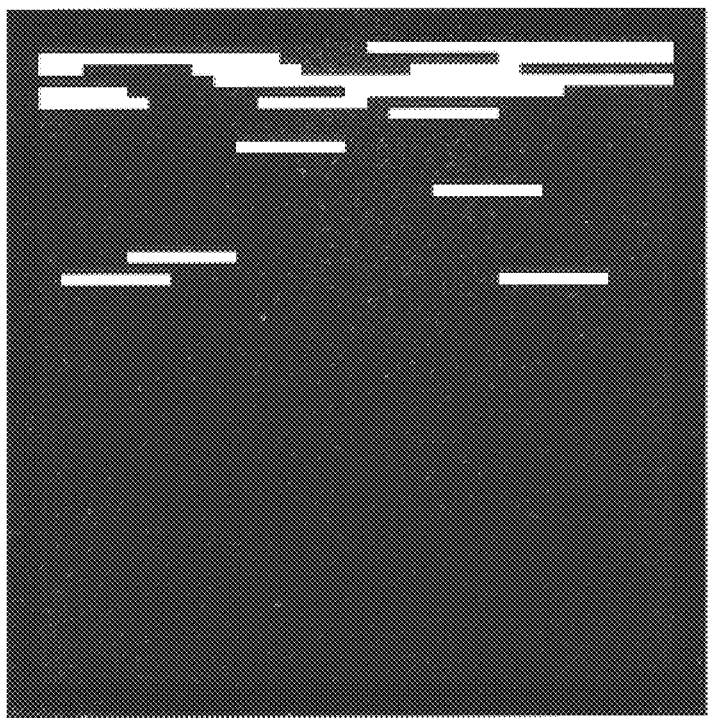
FIG. 2 illustrates a synchronization frame containing synchronization code and customization information as practiced according to one embodiment of the present invention.

FIG. 2 presents an example of this synchronization frame, which looks like a barcode image. The synchronization frame of FIG. 2 contains the synchronization code and the customization information.

Tested Features

Table 2 contains a list of tested features for one embodiment of the present invention. For this embodiment, we intended this testing device to test an MPEG coding chain from the outside, i.e., from an end-user viewpoint (e.g., broadcasters, television equipment manufacturers, and network providers). Hence, we did not test the bitstream syntax. For instance, one embodiment of the testing device cannot determine if the variable-length code (VLC) conforms to the MPEG specifications. However, alternate embodiments having the additional ability to test bit stream syntax can be produced. For example, P. H. Meehan et al. have described a bitstream syntax test procedure. See, P. H. Meehan et al., "MPEG Compliance Bitstream Design", *Proc. IEEE Consumer Electronics Soc.*, IEEE, Piscataway, N.J., 1995.

Returning to Table 2, each feature of this embodiment is listed, along with the test pattern that tests the feature. Some of these patterns mimic test procedures for analog television devices, while algorithms used in digital image coding inspire other patterns.

TABLE 2

Features currently supported by the test pattern generator and corresponding test patterns.

| Feature | Test Pattern |
| --- | --- |
| Luminance rendition | Moving luminance bars |
| Chrominance rendition | Moving color bars |
| Edge rendition | Rotating square and moving circle |
| Blocking effect | Chessboard pattern of diamonds |
| Isotropy | Moving circular zone plate |
| Abrupt scene changes | Scene with abrupt temporal changes |
| Noise test | Still image with increasing noise as a function of time |
| Text rendition | Moving and still text |
| Texture rendition | Animated texture |
| Time aliasing | Rotating circular wheel |
| Tracking, motion | Circular-moving zone plate and rotating-wheel pattern plus contour rendition with zooming, panning at variable speed, addition of noise |
| Buffer control | Complex images inserted in a test sequence |

Tested Features

Luminance and chrominance rendition tests consist of colored bars that move. In this way, we can examine color representation and possible color clipping.

By examining the influence of quantization and "mosquito noise" (phase ambiguity of the DCT, direct cosine transform), the edge rendition test looks at edge rendition as a function of orientation. For these purposes, the test sequence alternates between images of a rotating square and a moving circle. Both objects change color over time and their contours are antialiased.

The blocking effect test examines the appearance of blocking artifacts on a sequence of squares whose size decreases with time as the, number of squares increases. Each square is filled with a pattern whose luminance varies as a function of its spatial coordinates.

The isotropy test determines whether the coder is isotropic. This can be observed for either intra-coded or temporally predicted frames. The ideal test pattern is a circular-zone plate.

The abrupt scene changes test determines how well the coder copes with difficult scene changes, while the noise test examines the influence of increasing noise (as a function of time) on a still picture.

Block-DCT tends to have a disastrous effect on small fonts. Therefore, the text rendition test checks the coder's performance on text of various size.

The texture rendition test presents a time-varying texture to the coder.

To exhibit artifacts arising from poor motion estimation and compensation, we use the time-aliasing and motion rendition tests. They test both linear and nonlinear motion at various speeds and also simulate zooming and panning. These tests use circular-zone plate and rotating-wheel test patterns.

We can evaluate the performance of the bit rate regulation algorithm in constant bit rate coders using the buffer test. In constant bit rite coders, the buffer's fullness strongly influences an artifact's visibility. Hence, to evaluate the buffer, we test artifacts at various buffer occupancy levels. For one embodiment, the synthetic pattern for the buffer test consists of up to five texture images that are very complex to code. Inserting some of these in other test sequences fills the buffer to a certain level and allows us to study the behavior of the resulting artifacts.

Implementation

For one embodiment, our test pattern generator consists of software running on a Unix system. The test pattern generator can generate all of the test sequences described earlier, and users can fully customize the sequence. Output can be in any chroma format (luminance only, 4:2:0, 4:2:2, 4:4:4), and users can choose between interlaced or progressive formats. The test pattern generator can also generate motion at either full-, half-, or fractional-pixel accuracy.

Some of the test patterns comprise contours. Because a contour is by definition a high-frequency signal, sampling it is a delicate operation if we want a good visual impression. It was thus necessary to somehow emulate the low-pass filtering characteristics of acquisition devices by using anti-aliasing techniques, which yield smooth contours devoid of the well-known staircase effect.

For one test pattern generator embodiment, we use a two-point antialiasing method. See, X. Wu, "An Efficient Antialiasing Technique", *Computer Graphics*, Vol. 25, No. 4, July 1991, pp. 143–152. Another stage adds a gamma correction of the computed pixel value to eliminate the Moiré pattern that can appear with antialiasing techniques. To meet the system's low-cost and real-time implementation requirements, the test pattern generator incorporates various optimizations of the pattern generation algorithms. First, we use incremental techniques and exploit pattern symmetries to obtain the sampling (i.e., rendering) of drawing primitives. In the worst case, rendering a primitive requires only a few additions per pixel. In instances requiring fractional arithmetic, we used 16-bit fixed-point arithmetic instead of the more expensive floating-point arithmetic.

Examples of Test Patterns

In FIGS. 2 through 8 we present some test patterns and the resulting encoding/decoding process as performed by an embodiment using an MPEG-2 coding scheme.

Sequences and Encoding Parameters

Figure 3:
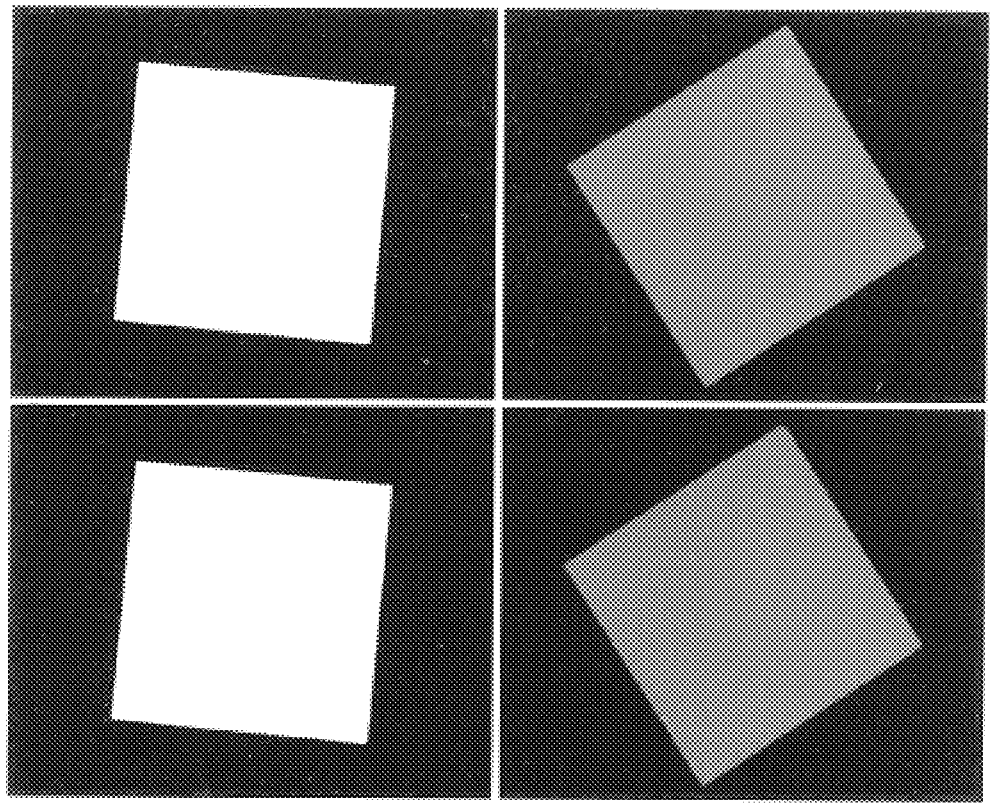
FIG. 3 illustrates the third and thirtieth frames of an edge rendition test sequence as practiced according to one embodiment of the present invention.

We generated all sequences shown in FIGS. 2 through 8 in CIF format (352×488, 30 Hz). They have been encoded and decoded using an MPEG-2 software simulator (provided by the MPEG Software Simulation Group, C. Fogg, "mpeg2encode/mpeg2decode", version 1.1, available by via web site at HTTP://www.mpeg.org/index.html/, MPEG Software Simulation Group, June, 1994) at main profile and main level. The encoding parameters were:

Bit rate: 750 Kbits/sec
Group of pictures dimension: 12 frames
I/P frame distance: 3 frames
Video buffer verifier size: 480 Kbits
Defaults quantization matrices
Progressive sequence
P-frame search window for motion estimation: 15 pixels
B-frame search window for motion estimation: 7×7 pixels Edge Rendition Several frames of the synthetic test patterns used for the edge rendition test are shown in FIG. 3. Specifically, frames three (top left) and thirty (top right) of the edge rendition test sequence are shown in FIG. 3, with the decoded frames shown below the originals. This test pattern features a rotating square that changes color over time. The test displays the square on a nonuniform background generated by a slowly varying function of the luminance value to which we add light white noise. The figure shows original and decoded versions of the frames. Contours exhibit some distortion due to coding; commonly called "Mosquito noise", this distortion is due to the phase ambiguity of the DCT.

Blocking Effect

Figure 4:
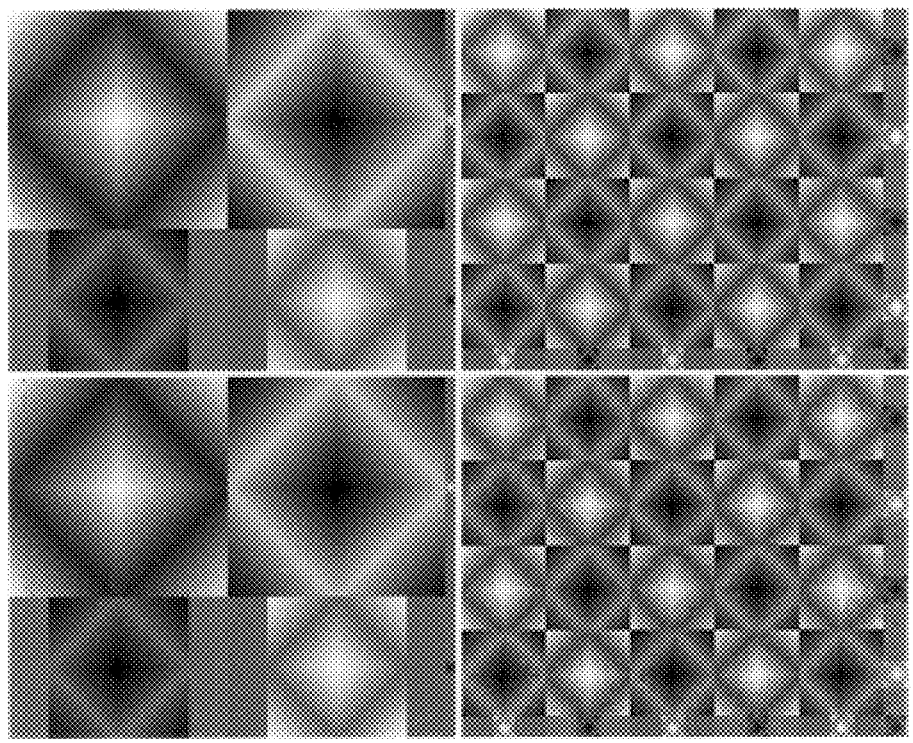
FIG. 4 illustrates the third and thirtieth frames of a blocking-effect test sequence as practiced according to one embodiment of the present invention.

The blocking-effect test sequence features a series of squares whose dimensions decrease with time. Specifically, frames three (top left) and thirty (top right) of the blocking-effect test sequence are shown in FIG. 4, with the decoded frames shown below the originals. Each square is filled with a slowly varying function of luminance that favors the appearance of the blocking effect due to the use of the block DCT. As sequence complexity increases, the blocking effect's importance increases as well.

Isotropy

Figure 5:
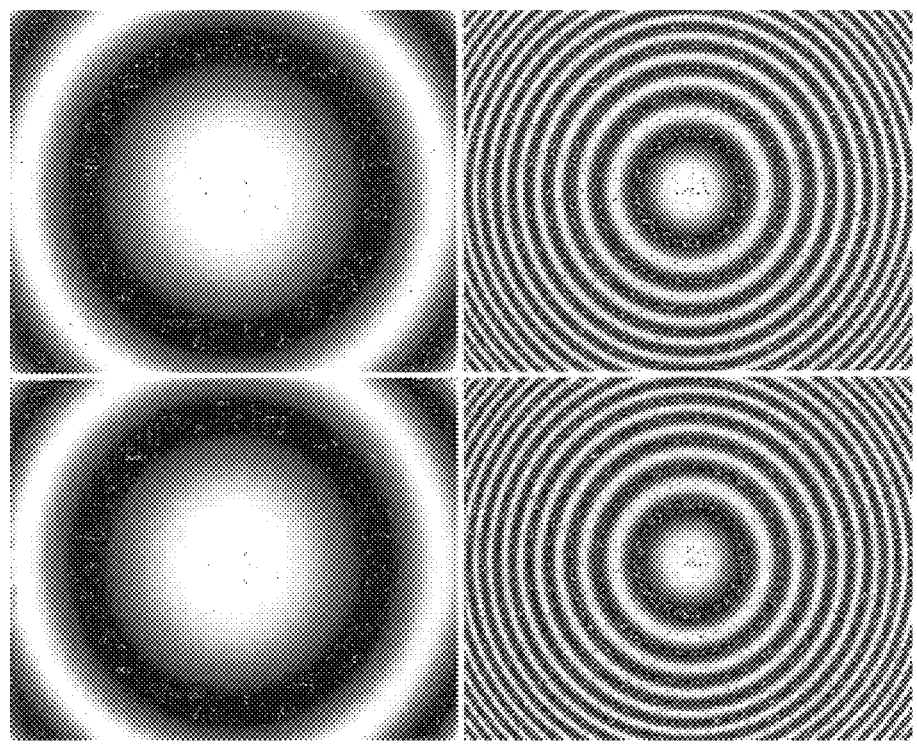
FIG. 5 illustrates the third and thirtieth frames of an isotropy test sequence as practiced according to one embodiment of the present invention.
Figure 6:
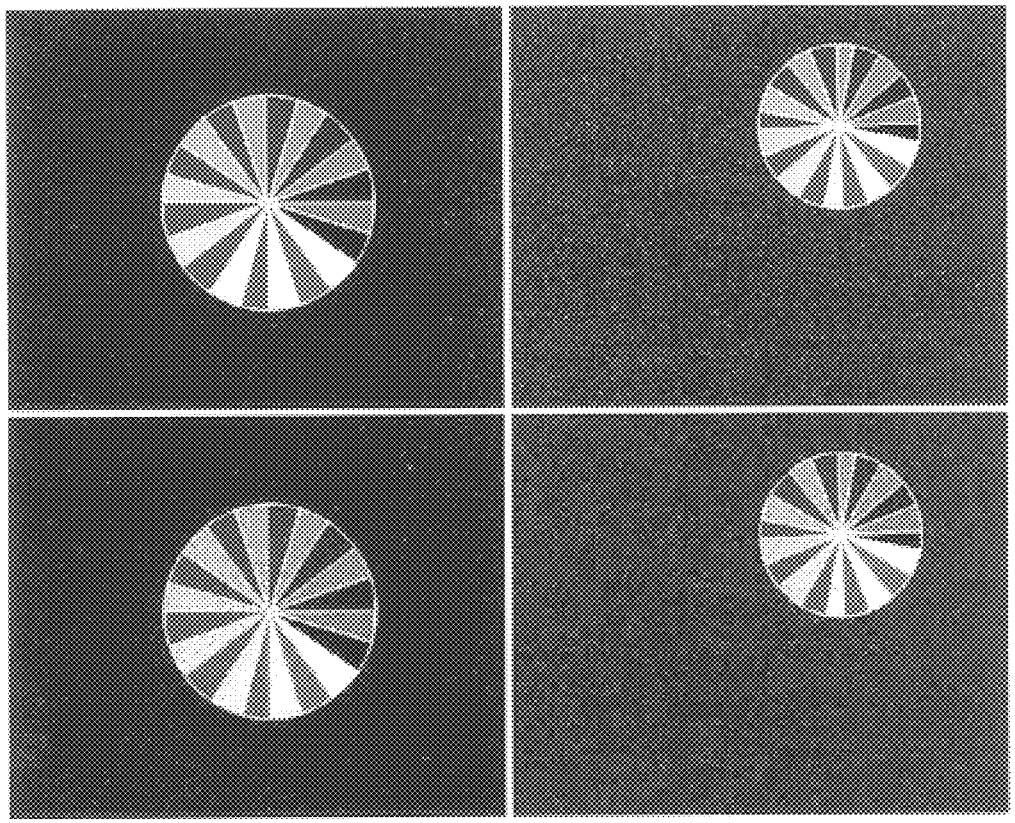
FIG. 6 illustrates the third and thirtieth frames of an edge rendition test sequence as practiced according to one embodiment of the present invention.
Figure 7:
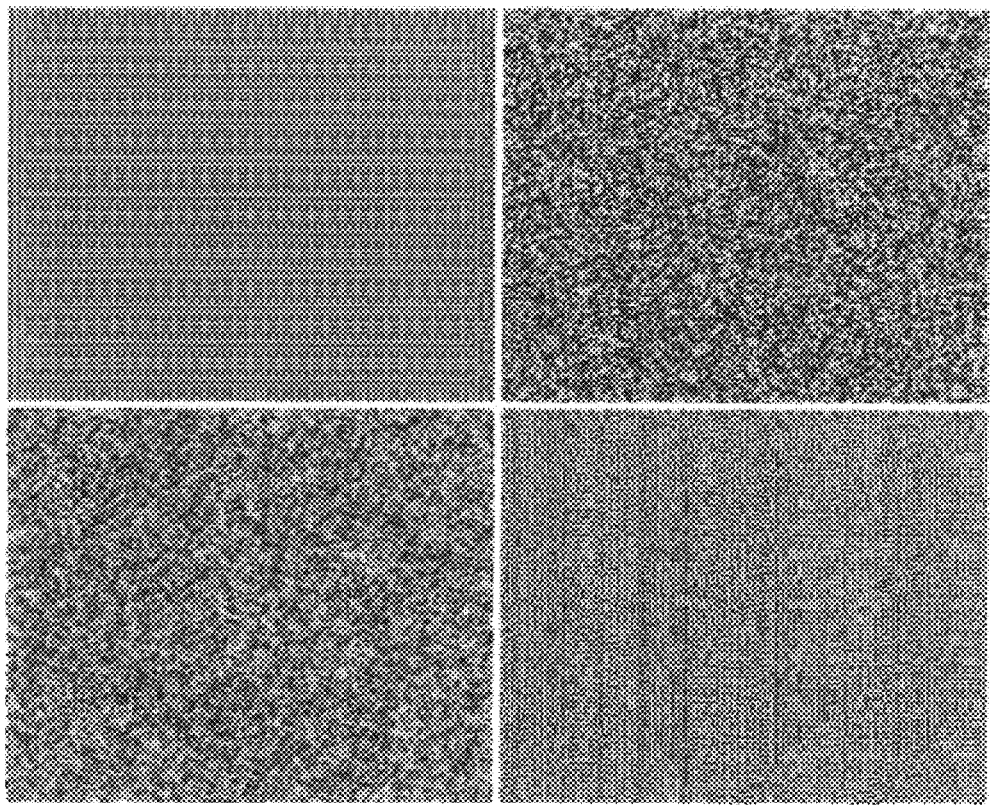
FIG. 7 illustrates complex texture frames used to fill the video buffer verifier according to one embodiment of the present invention.

A very well-known and widely used pattern for testing the isotropy of display or coding equipment is the zone plate. FIG. 5 shows two frames of the moving zone plate. Specifically, frames three (top left) and thirty (top right) of the isotropy test sequence are shown in FIG. 5, with the decoded frames shown below the originals. The top-right zone plate is at a higher frequency than the top-left. We add white noise to the plate to analyze the coder isotropy in the presence of noise.

Motion Rendition

This test is one of the most complex, because motion estimation is such a key feature of video coding. We divide the test into two main subsequences. The first tests the rendition of translational motion and uses the same zone plate as the isotropy test. We augment testing by simulating zooming and panning on the plate. The second subsequence, illustrated in FIG. 6, tests the rendition of non-translational motion on a rotating wheel. The wheel's center is initially still, but then moves as the test simulates zooming and panning.

Buffer Control

Figure 8:
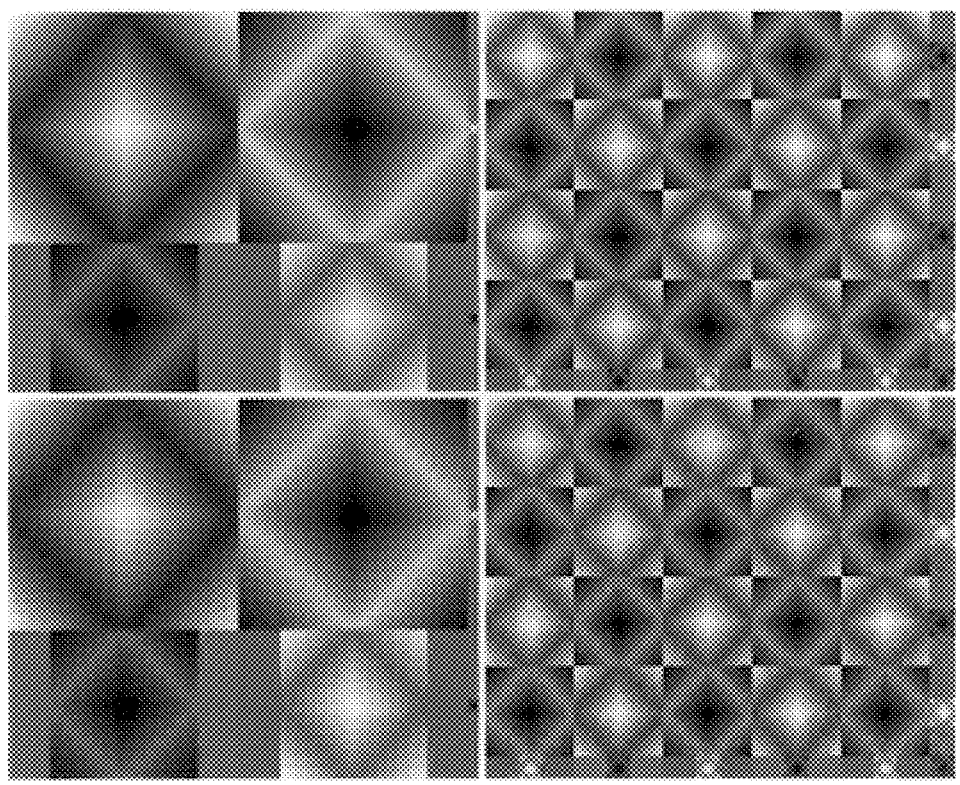
FIG. 8 illustrates the eighth and thirty fifth frames of a blocking-effect test sequence into which five frames of complex textures have been inserted immediately after the synchronization frame as practiced according to one embodiment of the present invention.

As explained previously, the buffer test has a structure different than that of the other tests. It consists of from one to five frames of complex textures (FIG. 4 illustrates four of them) that we can insert at the beginning of any other test. Encoding of such complex frames requires a large number of bits, and a constant bit rate MPEG-based system only meets the bit rate requirement over a full group of pictures (GOP). Thus, including such frames at a critical position (such as the beginning of a GOP) causes the output buffer to fill up quickly and forces a much coarser quantization of the subsequent frames (FIG. 8). Specifically, frames eight (top left) and thirty-five (top right) of a blocking-effect test sequence are shown in FIG. 8, with the decoded frames shown below the originals. This effect worsens as the buffer size decreases.

In our methodology, we do not simply check the bitstream syntax. Rather, our device will perform an end-to-end test in the pixel domain. We intend our device for use by broadcasters, equipment manufacturers, application designers, and network providers in testing decoders, encoders and transmission channels.

We have developed a design for the quality evaluation module 190. The generic quality measure of signal-to-noise ratio is well known to be uncorrelatable with human visual evaluation and is thus not preferred for use with our device. Prior work in this field concentrates on still-picture quality evaluation. See, P. M. Farrelle, *Recursive Block Coding for Image Data Compression*, Springer Verlag, N.Y., 1990; J. L. Manos and D. J. Sakrison, "The Effects of a Visual Fidelity Criterion on the Encoding of Images", *IEEE Trans. Information Theory*, Vol. IT-20, No. 4, 1974, pp. 525–536; J. A. Saghri, P. S. Cheatham, and A. Habibi, "Image Quality Measure Based on a Human Visual System Model", *Optical Eng.*, Vol. 28, No. 7, 1989, pp 813–818; and S. Comes and B. Macq, "Human Visual Quality Criterion", *SPIE Visual Comm. and Image Processing*, Vol. 1360, 1990, pp. 2–7.

Based on the test pattern generator, we have developed numerical metrics that parameterize distortions and account for human perception. For this purpose, we have developed a model of the human visual system. See: Christian J. van den Branden Lambrecht and Olivier Verschuere, "Perceptual Quality Measure using a Spatio-Temporal Model of the Human Visual System", *Proc. of the SPIE*, vol. 2668, pp. 450–461, SPIE, San Jose, Calif., Jan. 28–Feb. 2, 1996; Chistian J. van den Branden Lambrecht, "A Working Spatio-Temporal Model of the Human Visual System for Image Restoration and Quality Assessment Applications", *Proc. Int'l Conf. Acoustics, Speech, and Signal Processing*, pp. 2293–2296, IEEE, Piscataway, N.J., May 7–10, 1996; and C. J. van den Branden Lambrecht, *Perceptual Models and Architectures for Video Coding Applications*, PhD Thesis, Swiss Federal Institute of Technology, CH 1015 Lausanne, Switzerland, September, 1996. Each of these documents may be obtained via web site at HTTP://ltswww.epfl.ch/pub_files/vdb/.

Metrics

This section describes metrics suitable for use in evaluation module 190 of FIG. 1. It explains how using the above referenced knowledge about the human visual system, a model suitable for image processing purposes is built. The general structure of the model is presented in FIG. 9 and the various building blocks are described hereafter.

Figure 9:
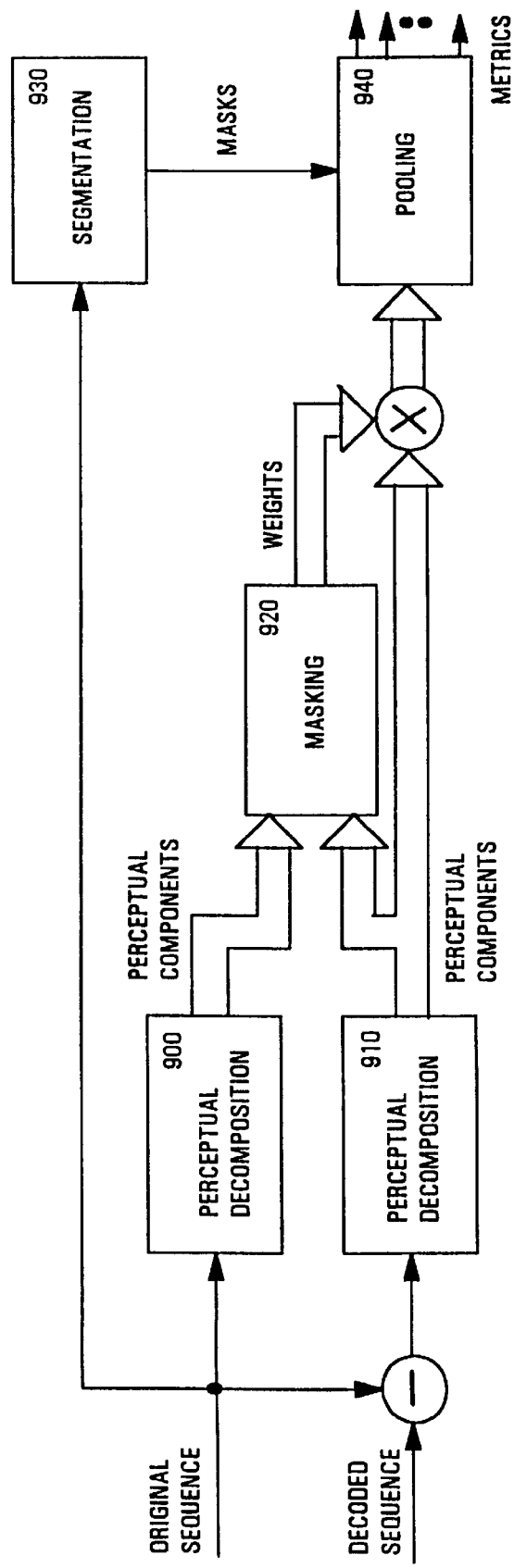
FIG. 9 illustrates a block diagram of quality metrics according to one embodiment of the present invention.

Thus, FIG. 9 is a block diagram of the quality metrics for an embodiment of the evaluation module 190 of FIG. 1. The thick lines represent a set of perceptual components. The thin lines represent sequences. The steps involved in the computation of the metric are the following: first of all, a coarse segmentation (930) of the original sequence is computed. The original and coding error sequences are decomposed into perceptual components by the filter bank (900 and 910). Contrast sensitivity and masking (920) are considered in each of the channels. This is done by computing, pixel by pixel, the actual detection threshold, considering that the original sequence will be a masker to the distortion. The masking strategy then consists of dividing the filtered error signal by the detection threshold. This expresses the data in units above threshold also referred to as just noticeable differences (jnd's). Finally, the data are pooled (940) over the channels to compute the distortion measures.

For one embodiment, the segmentation that is used segments the sequence into uniform areas, contours, and textures. Basically it proceeds as follows: the input images are parsed and processed block by block. The variance of each elementary block is computed, as well as the variance in the horizontal, vertical, and diagonal directions. This data will be used to assess the nature of the center pixel of the block. If the global variance is below some threshold, the pixel is considered as belonging to a uniform area. If the variance is above the threshold and more or less isotropic, the pixel is considered to be lying on a contour.

Masking the output of the perceptual channels predicts the response from the cells of area VI of the cortex. The data has then to be gathered together to account for higher level of perception, which is termed pooling. This work proposes a multi-measurement scheme, into which not only a global quality measure is computed for a sequence but some detailed metrics as well. For one embodiment, a global quality metric is calculated, as well as more detailed metrics that measure rendition of three basic components of images; uniform areas, contours, and textures. Pooling will be slightly different for the global metric than for the detailed metrics.

Human observers are never looking at the whole picture at the same time but rather at regions. This is due to both the focus of attention and the viewing distance. To take those facts into account, the global metric can be calculated over blocks of the sequence. Such blocks are three-dimensional and their dimensions are chosen as follows: the temporal dimension is chosen to consider focus of attention, i.e., the size is computed so that a block covers two degrees of visual angle, which is the dimension of the fovea. The distortion measure is computed for each block by pooling the error over the channels. Basically, the magnitude of the channels' output are combined by Minkowski summation with a higher exponent to weight the higher distortion more. The actual computation of the distortion E for a given block is computed according to eq. (1):

$$E = \left( \frac{1}{N} \sum_{c=1}^{N} \left( \frac{1}{N_x N_y N_t} \sum_{t=1}^{N_t} \sum_{x=1}^{N_x} \sum_{y=1}^{N_y} |e[x, y, t, c]| \right)^\beta \right)^{\frac{1}{\beta}}, \quad (1)$$

where e (x, y, t, c) is the masked error signal at position (x, y) and time t in the current block and in the channel c; $N_x$, $N_y$, and $N_t$ are the horizontal and vertical dimensions of the blocks; N is the number of channels. The exponent of the Minowski summation is $\beta$ and has a value of 4, which is close to probability summation. See Andrew B. Watson, *Handbook of Perception and Human Performance*, Vol. 1, Sensory Processes and Perception, Chapter 6, Temporal Sensitivity, John Wiley, 1986. This metric is termed moving picture quality metric (MPQM).

Pooling for the detailed metrics is slightly different. Once the masked error signal is known, a Minkowski summation is directly computed region by region (for textures, uniform areas, contours). This directly constitutes the distortion measure for each of the features.

The distortion E computed in Eq. (1) has to be expressed in some known scale to be significant. Because engineers are used to working with decibels (dB's), the distortion can be expressed on a logarithmic scale. A metric, that by analogy to the work of Comes, see Serge Colmes, *Les traitements perceptifs d'images numerisées*, PhD thesis, Université Catholique de Lovain, 1995, can be named MPSNR (masked peak signal-to-noise ratio), is then computed as:

$$MPSNR = 10\log_{10} \frac{255^2}{E^2}.$$

This scale does not have the exact same meaning as the known dB's, hence we refer to it as "visual decibels" (vdB's). Alternately, one can use a quality scale that has often been used for subjective testing in the engineering community. See, e.g., M. Ardito, M. Barbero, M. Stroppiana, and M. Visca, "Compression and Quality", In L. Chiariglione, editor, *Proceedings of the International Workshop on HDTV* 94, pp. B-8-2, Torino, Italia, Oct., 26–28, 1994, Springer Verlag; and S. Comes and B. Macq, "Human Visual Quality Criterion", *SPIE Visual Comm. and Image Processing*, Vol. 1360, 1990, pp. 2–7. It is a scale from 1 to 5, as described in Table 3.

TABLE 3

Quality rating on a 1 to 5 scale.

| Rating | Impairment | Quality |
|---|---|---|
| 5 | Imperceptible | Excellent |
| 4 | Perceptible, not annoying | Good |
| 3 | Slightly annoying | Fair |
| 2 | Annoying | Poor |
| 1 | Very Annoying | Bad |

The quality rating on this scale is obtained using the normalized conversion described in Eq. (2):

$$Q = \frac{5}{1 + NE}, \quad (2)$$

where Q is the quality rating and E is the measured distortion. N is a normalization constant. This constant is usually chosen so that a known reference distortion maps to a known quality rating. In the case of a perceptual metric as MPQM, the choice of N has to be made on the basis of the vision model. For one embodiment, N has been estimated in the following way. Assume a sequence that only has an error of one jnd in only one channel, at a single pixel of a single block. This is the smallest error that could theoretically be perceived. Hence the quality rating of that sequence should be extremely close to the highest quality level. We considered that such an error would yield a quality rating of 4.99 and solved for N in Eq. (2). The value of N turns out to be 0.623.

Thus, an automatic testing method and device has been described that can test a video sequence coder/decoder system and either assess the quality of decoded sequences or rate the fidelity of the coding chain.

The device produces synthetic test patterns that induce the appearance of known artifacts so as to be able to track and evaluate them. Based on this evaluation, it can rate the performance of the system with a good correlation with human judgment.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for testing at least a portion of a coding chain, the coding chain having an encoder, a transmission channel and a decoder, the method comprising the steps of:

receiving synchronization information regarding a first video sequence of synthetic patterns to be transmitted via the coding chain; and generating a second video sequence of synthetic patterns synchronously with the first sequence using the synchronization information, the second sequence for comparison to the first sequence to thereby test the portion of the coding chain.

2. A method as set forth in claim 1, the method further comprising the steps of:

receiving pattern sequence information regarding the first video sequence of synthetic patterns to be transmitted via the coding chain; and generating the second video sequence of synthetic patterns using the pattern sequence information.

3. A method as set forth in claim 1, the method further comprising the step of comparing the second sequence to the first sequence.

4. A method as set forth in claim 1, the method further comprising the step of decoding the first video sequence of synthetic patterns transmitted via the coding chain.

5. A method as set forth in claim 1, the method further comprising the steps of:

transmitting the first video sequence of synthetic patterns via the transmission channel; and decoding the first video sequence of synthetic patterns.

6. A method as set forth in claim 1, the method further comprising the step of encoding the first video sequence of synthetic patterns to be transmitted via the coding chain.

7. A method as set forth in claim 1, the method further comprising the step of generating pattern sequence information regarding the first video sequence of synthetic patterns to be transmitted via the coding chain.

8. A method as set forth in claim 1, the method further comprising the step of generating the first video sequence of synthetic patterns to be transmitted via the coding chain.

9. A method as set forth in claim 1, the method further comprising the step of generating complex texture images as part of the first video sequence of synthetic patterns to be transmitted via the coding chain to test buffer occupancy level induced artifacts.

10. An apparatus for testing at least a portion of a coding chain, the coding chain having an encoder, a transmission channel and a decoder, the apparatus comprising: a synchronizer to receive synchronization information regarding a first video sequence of synthetic patterns to be transmitted via the coding chain; and a first test pattern generator to generate a second video sequence of synthetic patterns synchronously with the first sequence using the synchronization information, the second sequence for comparison to the first sequence to thereby test the portion of the coding chain.

11. An apparatus as set forth in claim 10, wherein:

the synchronizer further receives pattern sequence information regarding the first video sequence of synthetic patterns to be transmitted via the coding chain; end the first test pattern generator generates the second video sequence of synthetic patterns using the pattern sequence information.

12. An apparatus as set forth in claim 10, the apparatus further comprising an evaluation module to compare the second sequence to the first sequence.

13. An apparatus as set forth in claim 10, the apparatus further comprising the decoder to decode the first video sequence of synthetic patterns transmitted via the coding chain.

14. An apparatus as set forth in claim 10, the apparatus further comprising:

the transmission channel to transmit the first video sequence of synthetic patterns; and the decoder to decode the first video sequence of synthetic patterns.

15. An apparatus as set forth in claim 10, the apparatus further comprising the encoder to encode the first video sequence of synthetic patterns to be transmitted via the coding chain.

16. An apparatus as set forth in claim 10, the apparatus further comprising a second test pattern generator to generate pattern sequence information regarding the first video sequence of synthetic patterns to be transmitted via the coding chain.

17. An apparatus as set forth in claim 10, the apparatus further comprising a second test pattern generator to generate the first video sequence of synthetic patterns to be transmitted via the coding chain.

18. An apparatus as set forth in claim 10, herein complex texture images are generated as part of the first video sequence of synthetic patterns to be transmitted via the coding chain to test buffer occupancy level induced artifacts.

* * * * *